United States Patent Office 3,035,011
Patented May 15, 1962

3,035,011
TRANSESTERIFICATION OF COPOLYMERS OF OLEFINS AND ORGANIC VINYL ESTERS WITH POLYFUNCTIONAL CARBOXYLIC ACIDS OR DERIVATIVES THEREOF AND METHOD OF MAKING SAME
Herbert Bartl, Koln-Stammheim, Otto Bayer, Leverkusen-Bayerwerk, and Hans Scheurlen, Leverkusen, Germany, assignors to Farbenfabriken Bayer Aktiengesellschaft, Leverkusen, Germany, a corporation of Germany
No Drawing. Filed Mar. 4, 1958, Ser. No. 718,983
Claims priority, application Germany Mar. 15, 1957
10 Claims. (Cl. 260—45.5)

This invention relates to a process for the preparation of cross-linked plastics by trans-esterification of copolymers of olefines and organic vinyl esters with polyfunctional carboxylic acids or derivatives thereof.

The copolymers capable of being cross-linked by trans-esterification can be produced by known polymerization processes from olefines such as propylene, isobutylene or, preferably, ethylene, on the one hand and from organic vinyl esters, for example vinyl acetate, vinyl propionate or vinyl benzoate, vinyl chloro acetate, on the other hand. The copolymers can if desired also contain other monomers incorporated by polymerization, such as for example vinyl chloride, acrylic esters, methacrylic esters, fumaric acid esters or acrylonitrile. The content of olefines in the polymers should preferably be at least 40%, and the content of organic vinyl esters preferably 5 to 60%, calculated on the weight of the copolymer, whereas the third component may be present in amounts of about 1 to 30 percent by weight.

Copolymers which have proved particularly suitable are ethylene-vinyl acetate copolymers which have a content of about 20 to 50% of incorporated vinyl acetate (calculated on the weight of the copolymer). Such copolymers, can for example be obtained by the processes disclosed in U.S. patent application Serial Nos. 614,788 (abandoned) and 703,763 (now U.S. Patent 2,947,735) filed in the name of Herbert Bartl on October 9, 1956, and December 19, 1957, respectively.

Examples of polyfunctional carboxylic acids are aliphatic and aromatic polycarboxylic acids, such as succinic acid, adipic acid, maleic acid, phthalic acid, terephthalic acid and citric acid, and branched or linear polyesters containing free carboxyl groups derived from polyhydric alcohols (glycol, diethylene glycol, glycerol, pentaerythritol, trimethylolpropane) and polybasic carboxylic acids (phthalic acid, terephthalic acid, maleic acid, fumaric acid, adipic acid, sebacic acid, azelatic acid). Particularly suitable, however, are polymers or copolymers containing carboxyl groups (preferably 2–20% by weight), such as can be obtained by polymerization or copolymerization of methacrylic acid, acrylic acid, maleic acid or maleic acid semi-esters of saturated alcohols such as maleic acid monoethyl-, butyl-, octyl-, dodecyl-, octadecyl esters, it being possible for monomers free from carboxyl groups such as e.g. compounds with one or more ethylene groups as for example styrene, vinyl chloride, vinylidene chloride, ethylene, butadiene, isoprene, acrylonitrile, to be used as copolymerization components. Examples of derivatives of polyfunctional carboxylic acids are their anhydrides, esters with lower aliphatic monohydric alcohols, acid halides, such as acid chlorides and acid bromides.

The amount of the used polyfunctional carboxylic acids or their derivatives as cross-linking agent is dependent on the amount of ester groups present in the copolymer. Thus it is possible to apply the cross-linking agents in such amounts that about 1–200 molar percent of carboxylic acid groups or of corresponding functional groups are present as calculated on the total amount of ester groups of the copolymer.

The trans-esterification can be carried out by known methods, for example by heating the components, preferably in the presence of 0.1–10% of known esterification catalysts such as strong inorganic acids as sulfuric acid, hydrochloric acid or strong aromatic acids such as p-toluene sulphonic acid or Friedel-Krafts catalyst such as boron fluoride, aluminum chloride, zinc chloride or addition compounds thereof or alcoholates of alkaline metals, alkaline-earth metals and aluminum of lower alcohols with 1 to 4 carbon atoms.

These components can be mixed on a roll mill or in kneading machines, and fillers, pigments, or plasticisers such as for example, dibutylphthalate, tricresylphosphate, can be simultaneously incorporated by mixing. Mixtures with other substances of high molecular weight are also possible, preferably those with a rubber-like character, such as natural or synthetic rubber. The cross-linking of the olefine copolymers can take place in moulds by heating to temperatures of about 100 to 180° C.

The process of the present invention can be used for the production of shaped elements such as filaments, tapes, films or foils. It is surprising that products having rubber-like elasticity are obtained in this way, especially when starting with ethylene-vinyl acetate copolymers containing 20 to 50% of vinyl acetate incorporated by polymerization. These elastomers have substantially the character of a vulcanized rubber; they have the advantage of improved resistance to ozone and ageing.

In the following examples, the parts indicated are parts by weight.

*Example 1*

200 parts of a copolymer of 50 parts of ethylene and 50 parts of vinyl acetate are mixed on a roll mill heated to about 100° C. for 5 to 10 minutes with 5 parts of p-toluene sulphonic acid and for another 5 minutes with 25 parts of a copolymer of maleic acid methyl semi-ester and butadiene (molar ratio in the copolymer 1:1). The mass thereby obtained is heated at 120° C. until completely cross-linked.

The material has become completely insoluble, has an elasticity of about 50%, high strength values and only a low permanent elongation. The hardness of the cross-linked copolymer is about 55° Shore.

*Example 2*

150 parts of a copolymer of 60 parts of ethylene and 40 parts of vinyl acetate are mixed as described in Example 1 with 3 parts of p-toluene sulphonic acid and 10 parts of polymethacrylic acid on a roll mill and cross-linked by heating at 120° C. The rubber-like product which is obtained is very elastic and has only slight permanent deformation with a high elongation at break.

*Example 3*

150 parts of a copolymer of 60 parts of ethylene and 40 parts of vinyl propionate are mixed as described in Example 1 with 3 parts of p-toluene sulphonic acid and 10 parts of polymethacrylic acid on a roll mill and cross-linked by heating at 120° C. The rubber-like product which is obtained is very elastic and has only slight permanent deformation with a high elongation at break.

*Example 4*

150 parts of a copolymer of 55 parts of ethylene and 45 parts of vinyl benzoate are mixed as described in Example 1 with 3 parts of p-toluene sulphonic acid and 10 parts of polymethacrylic acid on a roll mill and cross-linked by heating at 120° C. The rubber-like product

Example 5

150 parts of a copolymer of 70 parts of ethylene and 30 parts of vinyl acetate are mixed as described in the previous examples with 3 parts of aluminum isopropylate and 30 parts of a copolymer of 60 parts butadiene, 35 parts acrylonitrile and 5 parts acrylic acid and thereafter heated at 130° C. until cross-linking occurs. The material obtained in this way has a very high hardness and also good elasticity and strength values.

Example 6

200 parts of a copolymer of 55 parts of ethylene and 45 parts of vinyl acetate are mixed on a roll mill heated to about 120° C. for 10 minutes with 2 parts of p-toluene sulphonic acid and 12 parts tricarballylic acid. By curing the rough sheet at 140° C. an elastic material is obtained which became insoluble and has only slight permanent deformation.

We claim:

1. A process for the preparation of an elastomeric cross-linked copolymer which comprises heating to a temperature of about 100–180° C. a mixture of a copolymer of an olefin of 2–4 carbon atoms and an organic vinyl ester having a content of copolymerized organic vinyl ester of 5–60% by weight based on the weight of said copolymer, the cross-linkable substituents of the latter being the unsaponified ester groups, with a cross-linking agent selected from the group consisting of polybasic carboxylic acids, their anhydrides, their esters with lower monohydric aliphatic alcohols, their acid halides, and polymers of ethylenically unsaturated monomers containing 2–20% by weight of free carboxyl groups in the polymer.

2. Process of claim 1 wherein the copolymers used are ethylene/vinyl acetate copolymers containing 20–50% by weight of vinyl acetate incorporated by copolymerization.

3. Process of claim 1 wherein the reaction is conducted in contact with an esterification catalyst selected from the group consisting of inorganic acids and organic sulfonic acids, Friedel-Krafts catalysts, and alcoholates of 1–4 carbon monohydric alcohols with alkali metals, alkali earth metals, and aluminum, said catalyst being employed in an amount of 0.1–10% based on the weight of the copolymer to be cross-linked.

4. A process for the preparation of an elastomeric cross-linked copolymer which comprises heating a copolymer of an olefin of 2–4 carbon atoms and an organic vinyl ester having a copolymerized vinyl ester content of 5–60% by weight of said copolymer, the cross-linkable substituents of said copolymer being these unsaponified ester groups, to a temperature of about 100–180° C. with a cross-linking agent which comprises a polymer of ethylenically unsaturated monomers containing 2–20% by weight of free carboxyl groups in the molecule.

5. Process of claim 4 wherein said cross-linking agent is a polymer of an ethylenically unsaturated carboxylic acid.

6. Process of claim 4 wherein said cross-linking agent is a copolymer of a conjugated diolefin of 4–5 carbon atoms with an alpha-beta-ethylenically unsaturated carboxylic acid.

7. A process which comprises heating to a temperature of about 100–180° C. (1) a copolymer of an olefin of 2–4 carbon atoms, an organic vinyl ester, and another polymerizable ethylenically unsaturated monomer, the cross-linkable substituent of said copolymer being its unsaponified ester groupings, said copolymer containing incorporated therein 5–60% by weight of said organic vinyl ester and about 1–30% by weight of said polymerizable monomer, with (2) a cross-linking agent selected from the group consisting of polybasic carboxylic acids, their anhydrides, their esters with lower monohydric aliphatic alcohols, their acid halides, and polymers of ethylenically unsaturated monomers containing 2–20% by weight of free carboxyl groups in the polymer, to produce a cross-linked elastomeric copolymer.

8. A cross-linked elastomeric transesterification product of (1) a copolymer of an olefin of 2–4 carbon atoms and 5–60% by weight of an organic vinyl ester, the cross-linkable substituents of said copolymer being the unsaponified ester groups, and (2) a cross-linking agent selected from the group consisting of polybasic carboxylic acids, their anhydrides, their esters with lower monohydric aliphatic alcohols, their acid halides, and polymers of ethylenically unsaturated monomers containing 2–20% by weight of free carboxyl groups in the polymer.

9. A composition of matter comprising an admixture of (1) a copolymer of an olefin of 2–4 carbon atoms and an organic vinyl ester, said copolymer having incorporated therein 5–60% by weight of said organic vinyl ester and having as its cross-linkable substituent the unsaponified ester groups, (2) a cross-linking agent selected from the group consisting of polybasic carboxylic acids, their anhydrides, their esters with lower monohydric aliphatic alcohols, their acid halides, and polymers of ethylenically unsaturated monomers containing 2–20% by weight of free carboxyl groups in the polymer, said cross-linking agent being present in an amount such that 1–200 molar percent of carboxylic acid groups are present as calculated on the total amount of ester groups of the copolymer, and (3) an esterification catalyst selected from the group consisting of inorganic acids and organic sulfonic acids, Friedel-Krafts catalysts, and alcoholates of 1–4 carbon monohydric alcohols with alkali metals, alkali earth metals, and aluminum, said catalysts being used in amounts of 0.1–10% based on the weight of the copolymer to be cross-linked.

10. A process for the preparation of an elastomeric cross-linked copolymer which comprises heating a copolymer of ethylene and 20–50% by weight of vinyl acetate to a temperature of about 100–180° C. with a cross-linking agent which comprises a polymer of ethylenically unsaturated monomers containing 2–20% by weight of free carboxyl groups in the molecule.

References Cited in the file of this patent

UNITED STATES PATENTS

| 2,451,963 | Loder | Oct. 19, 1948 |
| 2,557,266 | Dittmar | June 19, 1951 |
| 2,766,214 | Erchak et al. | Oct. 9, 1956 |
| 2,849,332 | Smith | Aug. 26, 1958 |

FOREIGN PATENTS

| 578,992 | Great Britain | July 19, 1946 |